No. 748,235. Patented December 29, 1903.

UNITED STATES PATENT OFFICE.

ALPHEUS ALONZO TURNER, OF BRISTOL, INDIANA.

COMPOSITION OF MATTER USED AS VENEER OR COVERING FOR WOOD OR CANVAS, &c.

SPECIFICATION forming part of Letters Patent No. 748,235, dated December 29, 1903.

Application filed April 18, 1903. Serial No. 153,256. (No specimens.)

*To all whom it may concern:*

Be it known that I, ALPHEUS ALONZO TURNER, a citizen of the United States, residing at Bristol, in the county of Elkhart and State of Indiana, have invented a new and useful composition of matter to be used as a veneer or covering for wood or canvas or be made into solid blocks or slabs, of which the following is a specification.

My composition consists of the following ingredients: Portland cement, molasses, (sugar-cane is best,) glue, and sand. The proportions used must be according to what is to be made. If the mixture is to be pliable after hardening, more molasses is to be used than in making a block or when it is to be applied to wood. The proportions to be used for spreading thinly on canvas should be, (by measure:) cement, one gallon; molasses, two gallons; glue, one gallon, (liquid;) sand, one gallon. The amount of cement, molasses, and sand must be increased or diminished, as the case may demand. The amount of glue need not be changed. It is so simple that a mechanic can proportion the amounts as required.

In using the above-named composition I first dissolve the glue as I would for ordinary gluing, except I put water enough in the glue to thin it like thin cream. I then heat the molasses (near the boiling-point) and then mix molasses and glue while hot, thoroughly mix cement and sand dry, and then add molasses and glue, and mix well. It is now ready for use.

My composition is to be used as a veneer or covering for wood or canvas or anything that necessitates veneering or covering, or it can be made into blocks or slabs and used as lumber is used in building buildings. Molasses plays an important part in the composition, and while it does not increase the strength of cement it keeps it from setting or cementing at once, and therefore gives ample time to mold and fashion the mixture in any shaped desired. It requires from four to six weeks for the matter to become thoroughly hardened, and during that time it can be worked to a finish ready for paint or varnish. Glue increases the adhesive qualities of the cement and molasses, and therefore will adhere to wood, canvas, or whatever it may be applied to.

What I claim, and desire to secure by Letters Patent of the United States, is—

The herein-described composition of matter consisting of Portland cement, sand, molasses, and glue, all commingled as and for the purpose set forth.

ALPHEUS ALONZO TURNER.

Witnesses:
A. LAMAR LAMPORT,
LUCIUS J. GREENAN.